(12) United States Patent
Wagstaff

(10) Patent No.: US 11,113,600 B2
(45) Date of Patent: Sep. 7, 2021

(54) TRANSLATING SENSOR INPUT INTO EXPERTISE

(71) Applicant: Bsquare Corp., Bellevue, WA (US)

(72) Inventor: David Wagstaff, Lake Forest, CA (US)

(73) Assignee: Bsquare Corp., Bellevue, WA (US)

( * ) Notice: Subject to any disclaimer, the term of this patent is extended or adjusted under 35 U.S.C. 154(b) by 784 days.

(21) Appl. No.: 15/982,665

(22) Filed: May 17, 2018

(65) Prior Publication Data

US 2018/0336494 A1 Nov. 22, 2018

Related U.S. Application Data

(60) Provisional application No. 62/507,638, filed on May 17, 2017.

(51) Int. Cl.
*G06N 3/08* (2006.01)
*G06N 5/04* (2006.01)
*G06N 20/00* (2019.01)
*G05B 13/02* (2006.01)
*G06N 7/00* (2006.01)

(52) U.S. Cl.
CPC ........... *G06N 3/08* (2013.01); *G05B 13/0265* (2013.01); *G06N 3/084* (2013.01); *G06N 5/04* (2013.01); *G06N 20/00* (2019.01); *G06N 7/005* (2013.01)

(58) Field of Classification Search
None
See application file for complete search history.

(56) References Cited

PUBLICATIONS

Samrin, et al., Hybrid Weighted K-Means Clustering and Artificial Neural Network for an Anomaly-Based Network Intrusion Detection System, De Gruyter, <https://doi.org/10.1515/jisys-2016-0105>, 2016, pp. 1-20 (Year: 2016).*
Zhang, et al., A New Deep Learning Model for Fault Diagnosis with Good Anti-Noise and Domain Adaptation Ability on Raw Vibration Signals, Sensors 2017, 17(3):425, 2017, pp. 1-21 (Year: 2017).*

* cited by examiner

*Primary Examiner* — Wilbert L Starks
(74) *Attorney, Agent, or Firm* — Rowan TELS LLC

(57) ABSTRACT

A method including receiving input data; selecting a classification scheme; transforming the input data into transformation data utilizing the classification scheme; transforming the input data into machine learner outputs; comparing the transformation data to the machine learner outputs; and altering machine state of one or more machines in response to comparing the transformation data to the machine learner outputs. Further, a method including receiving one or more sensor inputs; receiving one or more machine insights, the one or more machine insights comprising one or more states; selecting one of the one or more states; determining conditions of the one of the one or more states; comparing the conditions to the one or more sensor inputs; and altering a machine state of one or more machines in response to comparing the conditions to the one or more sensor inputs.

18 Claims, 12 Drawing Sheets

TRANSLATING SENSOR INPUT INTO EXPERTISE

CROSS REFERENCE TO RELATED APPLICATIONS

This application claims the benefit of U.S. provisional patent application Ser. No. 62/507,638, filed on May 17, 2017, the contents of which are incorporated by reference herein in their entirety.

BACKGROUND

With the advent of increasing automation and computerization, many industries have seen a transition away from traditional expert-based fault diagnostics and have developed increasing reliance on diagnostic data from machine sensors. Diagnostic systems are traditionally designed utilizing explicit knowledge and rigid algorithms, and while this has allowed for increases in efficiency in many cases, it has also greatly reduced the number of diagnostic and maintenance experts. While sensor and diagnostic data are often very useful, they are far from perfect and often miss less quantifiable things that a human is able to, for example, the sound a particular engine part is making or the feel of a steering wheel. As these expert roles decrease rapidly, there is ever greater reliance on this shrinking talent pool to fill in the gaps where sensor data fails. Further, as these experts retire or leave the field, their "tribal knowledge" is departing with them, often uncommunicated to younger colleagues who may not have learned their skills in the same way, or had the same breadth of experience. Given how few of these experts are left, it is also unfeasible to have them directly train all new people on the techniques and other tacit knowledge they have accrued over the years. This means that this valuable tacit information and "intuition" brought about by experience in the field will likely all but disappear from many industries in the coming years. New technicians will either be forced to learn this information for themselves, at additional cost, or may simply have to rely solely on explicit knowledge from diagnostic systems and thereby waste valuable time, money, and effort utilizing a "guess-and-check" approach.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

"Cluster logic" herein refers to hardware or software to group a set of microstates into one or more groups of finite states. If Input={mstate1, mstate2, . . . , mstaten} Output={state1, state2, . . . , statei}. Other examples of cluster logic will be readily apparent to those of skill in the art, without undo experimentation.

"Finite states" herein refers to one or more condition of a system in which the way in which the system may interact internally or with its environment depends on the condition it is in at a given instant in time.

"Machine insights" herein refers to a list of potential states in the future, and probabilities thereof. In input={(state1, transtion1), (state2, transition2), . . . , (statex, transitionx)} output={(statea, Pa), (stateb, Pb), . . . , (statey, Py)}. Other examples of machine insights will be readily apparent to those of skill in the art, without undo experimentation.

"State and transition behavior" herein refers to a list of finite states exhibited by an object and transitions that have been made. Behavior.state.transition={(state1, transition1), (state2, transition2), . . . , (statex, transitionx)}. Other examples of state and transition behavior will be readily apparent to those of skill in the art, without undo experimentation.

"Temporal direction" herein refers to a list of previous states preceding the current state.

"Update logic" herein refers to hardware or software to detect a version in current use, determine if another version is to be deployed, and deploy that logic. If version.current=version.x-n AND version.x then version.current=version.x. Other examples of update logic will be readily apparent to those of skill in the art, without undo experimentation.

Figure 1:
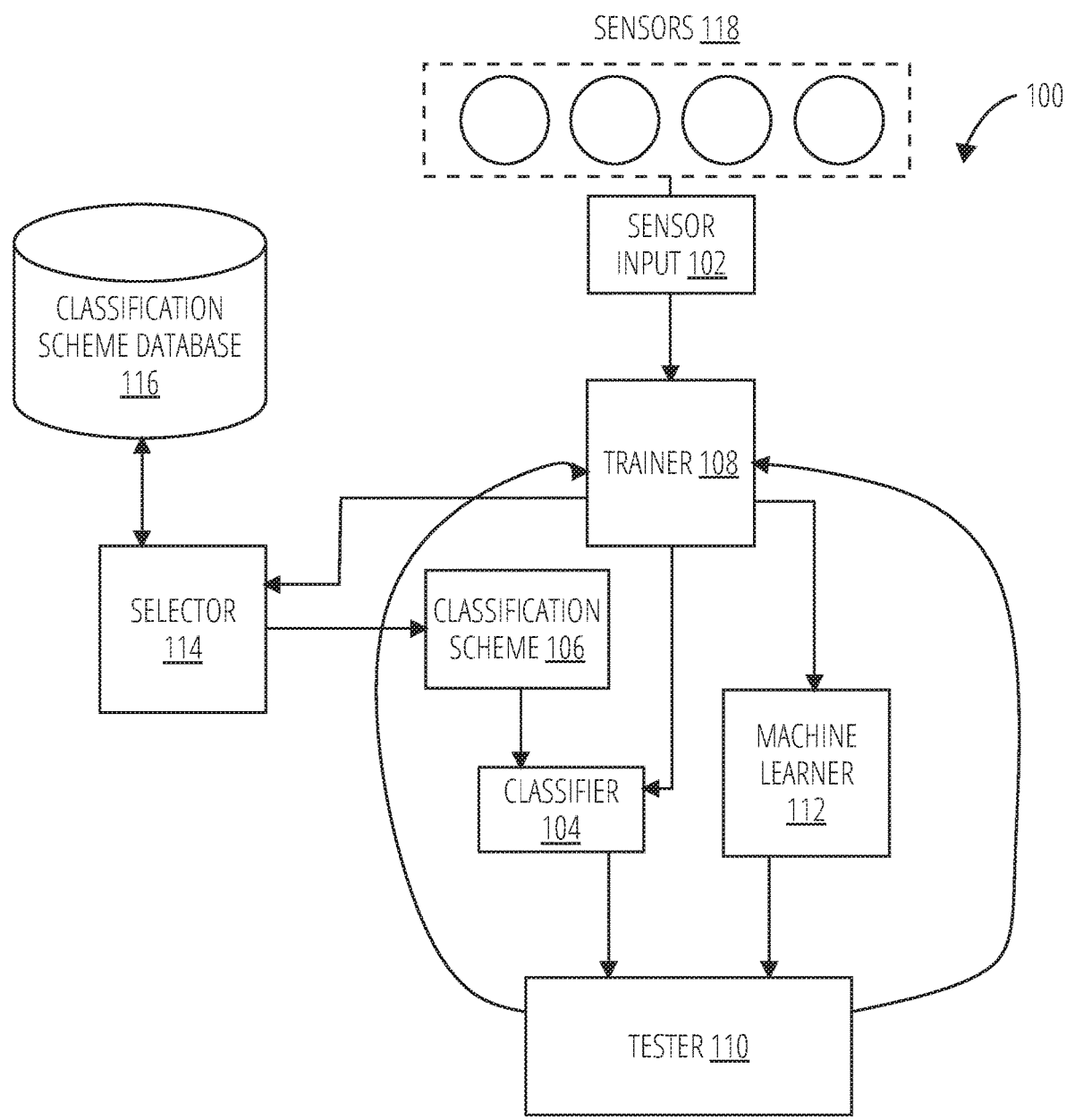
FIG. 1 illustrates an embodiment of a machine training system 100.

The system and method herein described allow for the training of machine learning models (for example, artificial neural networks) for the prediction, modeling and detection of machines. The decrease of expert personnel in a variety of fields creates a gap which cannot be filled by standard "raw" sensor data. For example, while a truck may not have any direct sensor input to indicate that there may be a suspension fault, a mechanic who has a great amount of experience with suspension components may recognize the failure of a ball joint or other component on sight, or after minimal inspection or testing. They may recognize "secondary" experiential data, such as the look of the components, the feel of the steering wheel while driving, the sound it is making and the amount of play in the joints when pressure is applied in certain directions. The expert may recognize these specific symptoms from prior experience or from making "intuitive" connections based on commonalities witnessed between different issues. Intuition and experience in a field is often the result of the human mind recognizing patterns and correlations which it has seen repeated over and over again. By leveraging current techniques in signal processing and data analysis, the system trains machine learning models utilizing data collected from sensors and input by experts. Image and sound recognition networks may be assembled and correlated with unsupervised and expert-supervised learning to allow for the aggregation and application of data to predict and troubleshoot issues. Unsupervised (for example, Anomaly detection, clustering, neural networks, and well known techniques for learning latent variable models), and supervised learning techniques may be employed to achieve this end. Variable relationships may be established utilizing techniques well known in the art, for example, principal component analysis, partial least squares, and cosine distance. The system receives sensor input from a set of sensors, for example, audio, video, electrical, and vibration sensors. This data is then transmitted to the trainer. The trainer may be a controller which handles the compilation of training data and its distribution to the other modules. The trainer receives the data and may transform the data into training data. The trainer may also partition the data into testing and training sets. The transformed/partitioned data is transmitted to the classifier and the machine learner. The trainer may also receive results from the tester in order to adjust the generation and selection of training data to send to the classifier and the machine learner. The trainer may utilize a classifier from a classification scheme which has been selected from the classification scheme database, and may transform the training data using the selected classification scheme, and transmit the result to the tester for review. The classification scheme may employ a number of statistical, heuristic, mathematic, and machine learning algorithms to analyze the data, for example, these may include time-frequency analysis Fourier transforms, and Wavelet transforms. The machine learner receives the training data, generates a solution based on the current configuration, and sends the result to the tester. The tester receives and compares the results from both the classifier and the machine learner. The tester then transmits the comparison to the trainer to determine whether to alter the machine learner, perform another comparison with another classification scheme, or send further sensor input data to the classifier and the machine learner Referring to FIG. 1, the machine training system 100 comprises a sensor input 102, a classifier 104, a classification scheme 106, a trainer 108, a tester 110, a machine learner 112, a selector 114, a classification scheme database 116, and sensors 120.

The sensor input 102 receives data from the sensors 120 and sends the data to the trainer 108. The trainer 108 receives the data and transforms the data into training data, which is sent to both the classifier 104 and the machine learner 112. The trainer 108 may also receive results from the tester 110 to influence the generation and selection of training data to send to the classifier 104 and the machine learner 112. The classifier 104 determines a classifier 104 from the classification scheme 106, transforms the training data using the selected classification scheme 106, and sends the result to the tester 110. The classification scheme 106 may include time-frequency analysis Fourier transforms, and Wavelet transforms. The machine learner 112 receives the training data, generates a solution based on the current configuration, and sends the result to the tester 110. The tester 110 receives and compares the results from both the classifier 104 and the machine learner 112. The tester 110 then sends the comparison to the trainer 108 to determine whether to alter the machine learner 112, perform another comparison with another classification scheme 106, or send further sensor input data to the classifier 104 and the machine learner 112.

The machine training system 100 may utilize various methods to train the machine learner 112 including Levenberg-Marquardt, Quasi-Newton, Resilient Back propagation, Scaled Conjugate Gradient, Conjugate Gradient with Powell/Beale Restarts, Fletcher-Powell Conjugate Gradient, Polak-Ribiére Conjugate, GradientOS, Strainoss, One Step Secant, Back-propagation, and Variable Learning Rate Back propagation.

Figure 6:
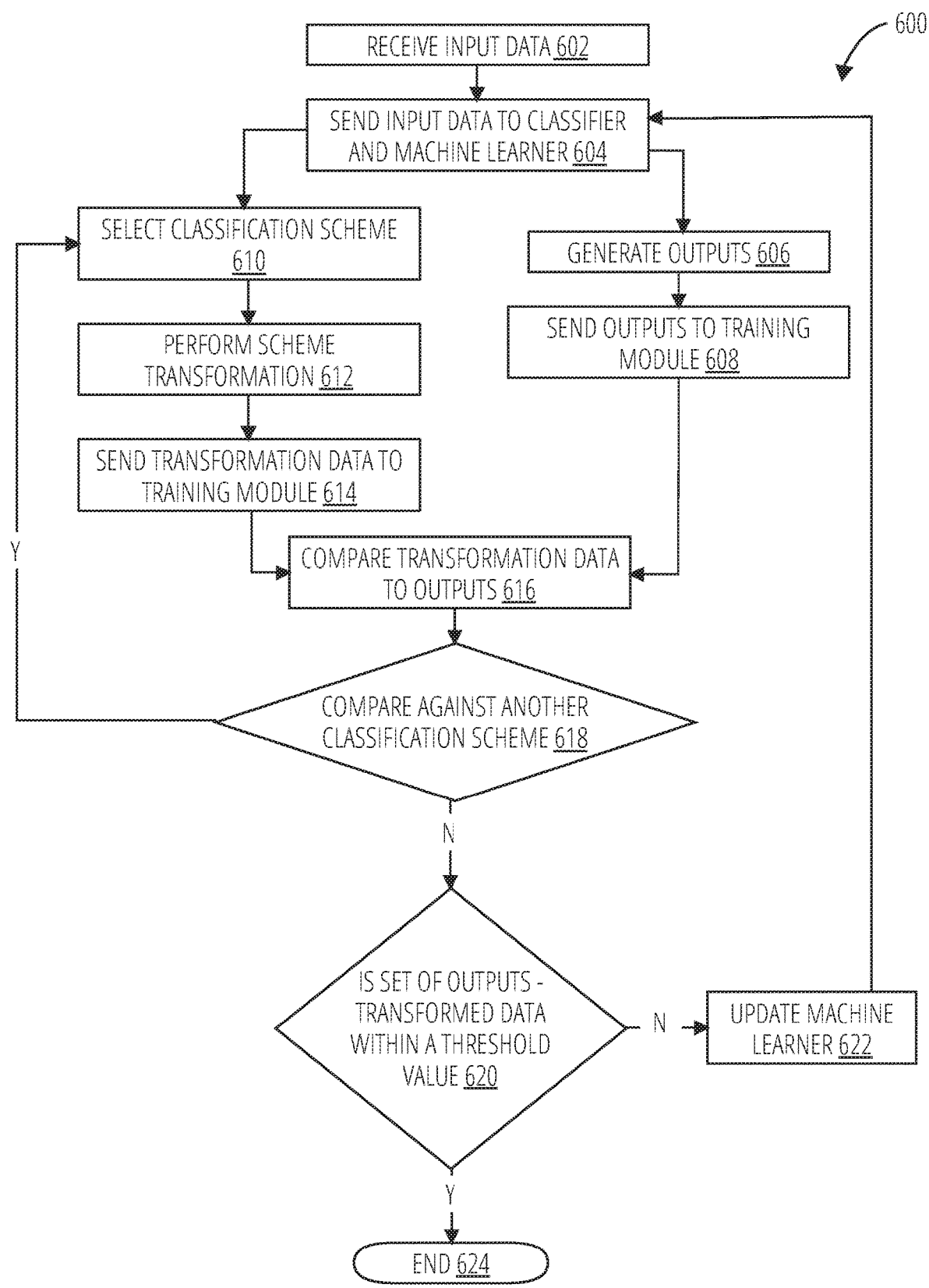
FIG. 6 illustrates an embodiment of a machine training method 600.

The machine training system 100 may be operated in accordance with FIG. 6.

Figure 2:
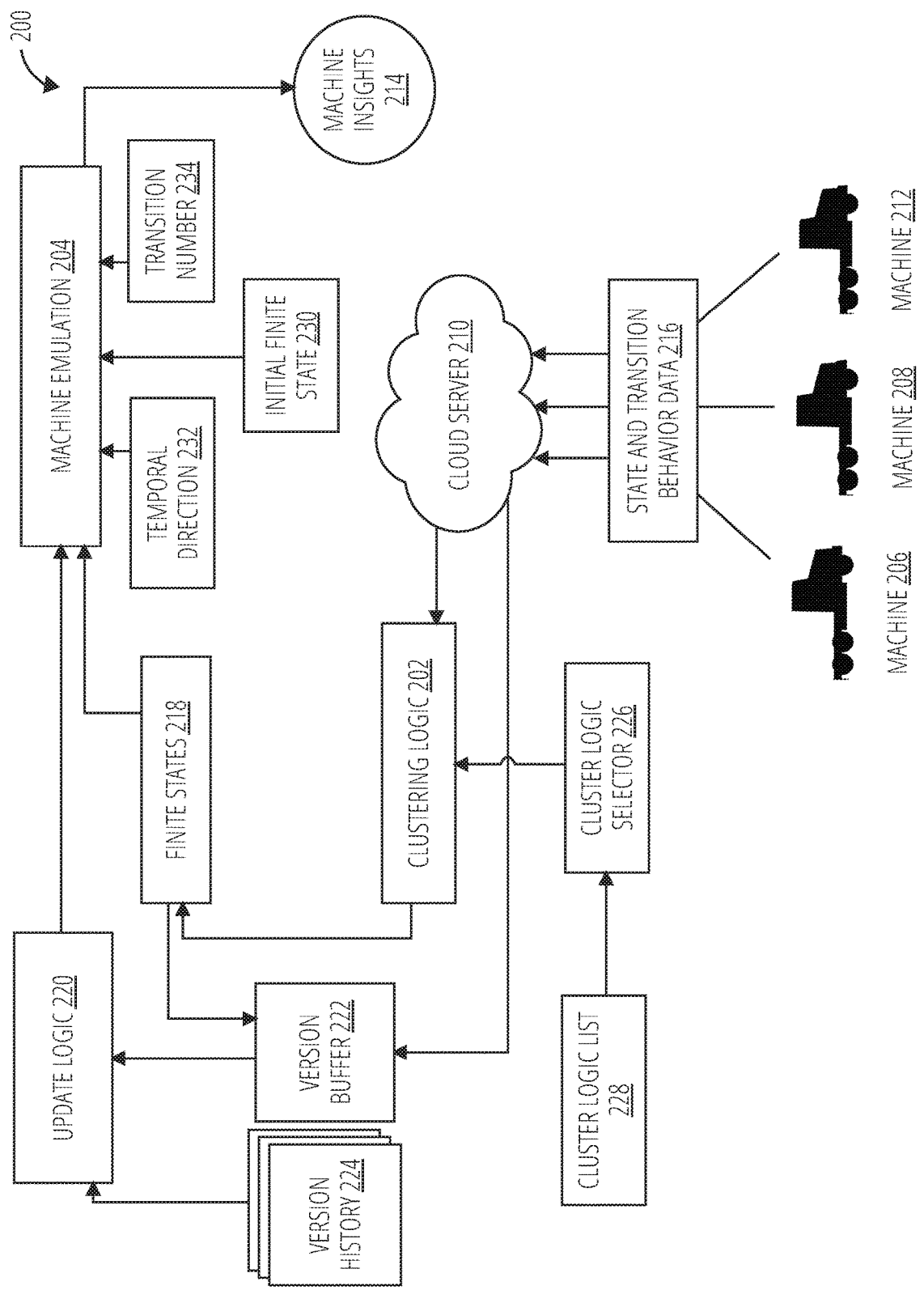
FIG. 2 illustrates an embodiment of a system for device behavior modeling based on empirical data 200.

FIG. 2 illustrates an embodiment of a system for device behavior modeling based on empirical data 200.

The system for device behavior modeling based on empirical data 200 comprises a machine emulation 204, a cloud server 210, machine insights 214, a machine 206, a machine 208, a machine 212, state and transition behavior data 216, finite states 218, an update logic 220, a clustering logic 202, a version buffer 222, a version history 224, a cluster logic selector 226, a cluster logic list 228, a temporal direction 232, an initial finite state 230, and a transition number 234.

The cloud server 210 collects the state and transition behavior data 216 from the machine 206, the machine 208, and the machine 212. The cluster logic selector 226 automatically selects the clustering logic 202 from the cluster logic list 228. Based on the data, the cluster selector may dynamically select the best clusterer from the cluster logic list 228 without human supervision. The clustering logic 202 receives the state and transition behavior data 216 and groups microstates into the finite states 218. The finite states 218 are deployed as the machine emulation 204. The version buffer 222 receives updated state and transition behavior data from the cloud server 210 and updated finite states 218 from the clustering logic 202. The update logic 220 updates the version of the machine emulation 204 currently deployed. By version controlling the machine emulation 204 in this manner, constant updates can be made to improve the model. The update logic 220 may also update the machine emulation 204 with a previous version from the version history 224. The machine emulation 204 may be operated with the temporal direction 232, the initial finite state 230 and the transition number 234 to produce the machine insights 214.

Figure 3:
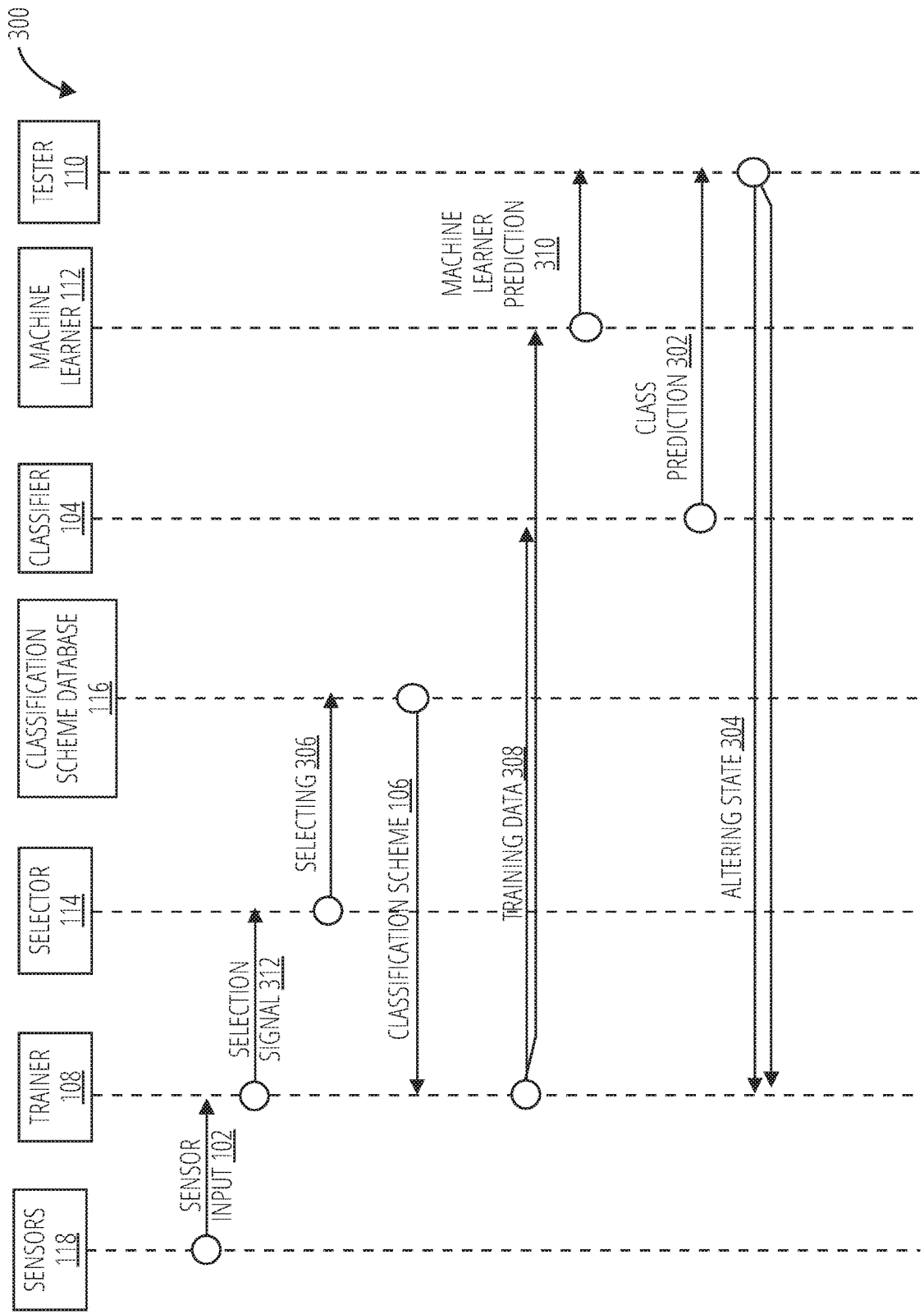
FIG. 3 illustrates a method workflow 300 for a machine learner system in accordance with one embodiment.

Referencing FIG. 3, the method workflow 300 comprises a sensor input 102, a classifier 104, a classification scheme 106, a trainer 108, a tester 110, a machine learner 112, a selector 114, a classification scheme database 116, sensors 120, a class prediction 302, an altering state 304, a selecting 316, a training data 318, a machine learner prediction 322, and a selection signal 324.

The sensors 120 transmits the sensor input 102 to the trainer 108. The trainer 108 transmits the selection signal 324 to the selector 114, to select (selecting 316) the classification scheme 106 from the classification scheme database 116. The trainer 108 transmits the training data 318 to the classifier 104 and the machine learner 112. The classifier 104 generates a class prediction 302 and sends it to the tester 110, and the machine learner 112 generates a machine learner prediction 322 and transmits it to the tester 110. The tester 110 sends a signal to the trainer 108 to alter a machine state (altering state 304).

Figure 4:
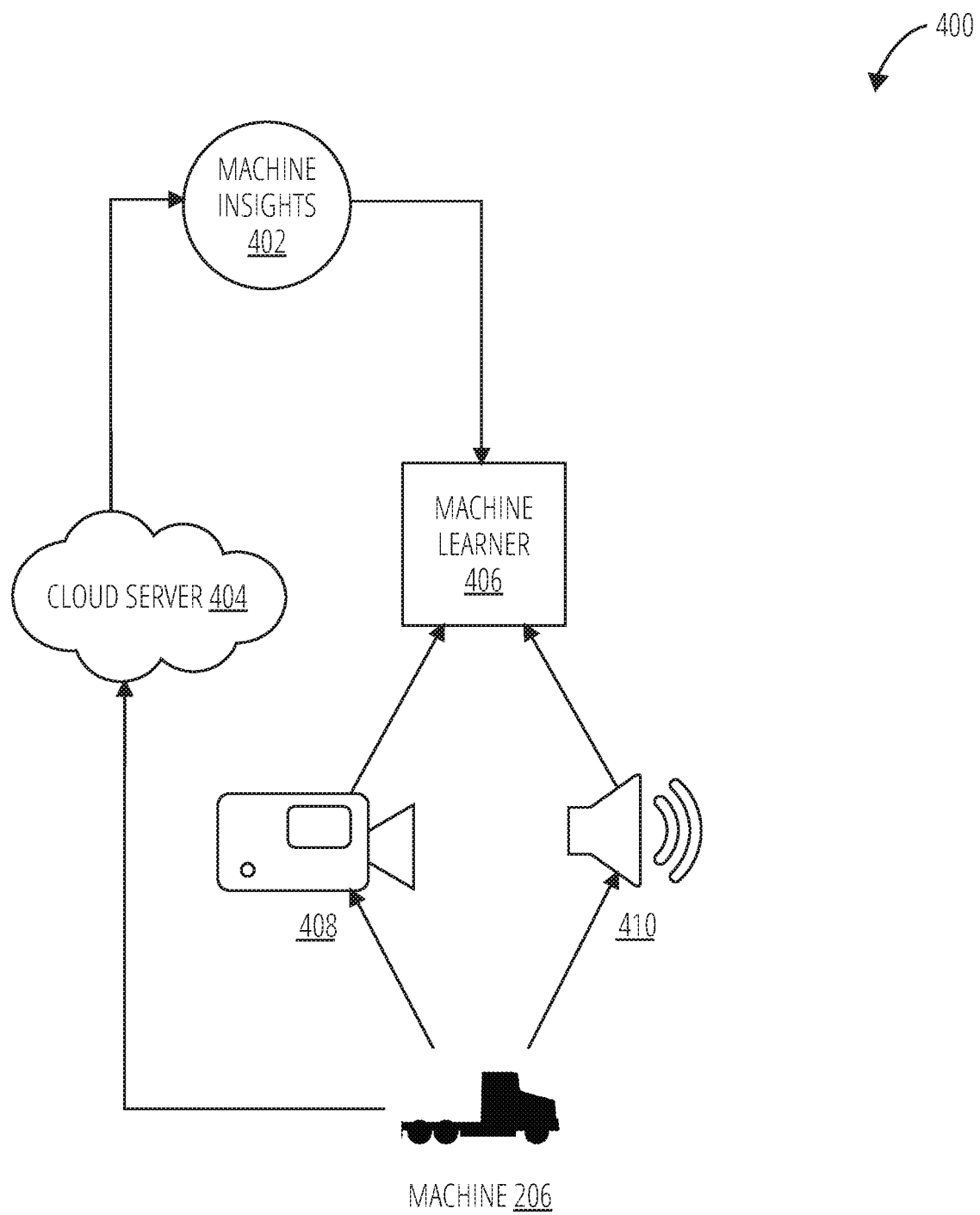
FIG. 4 illustrates an embodiment of a machine learner system 400.

Referring to FIG. 4, the machine learner system 400 comprises a machine 206, machine insights 402, a cloud server 404, a machine learner 406, a visual sensor 408, and an audio sensor 410.

The machine 206 operates and sends state and transition behavior data to the cloud server 404. The cloud server 404 produces the machine insights 402 utilizing a system similar to the system for device behavior modeling based on empirical data 200 illustrated in FIG. 2. The machine insights 402 are then sent to the machine learner 406. The visual sensor 408 and the audio sensor 410 receive EM and sound, respectively, from the machine 206. The visual sensor 408 and the audio sensor 410 transform those inputs into sensor data inputs, which are sent to the machine learner 406. The machine learner 406 receives the machine insights 402 and the sensor data inputs, and correlates the sensor data inputs with machine states provided by the machine insights 402.

Figure 5:
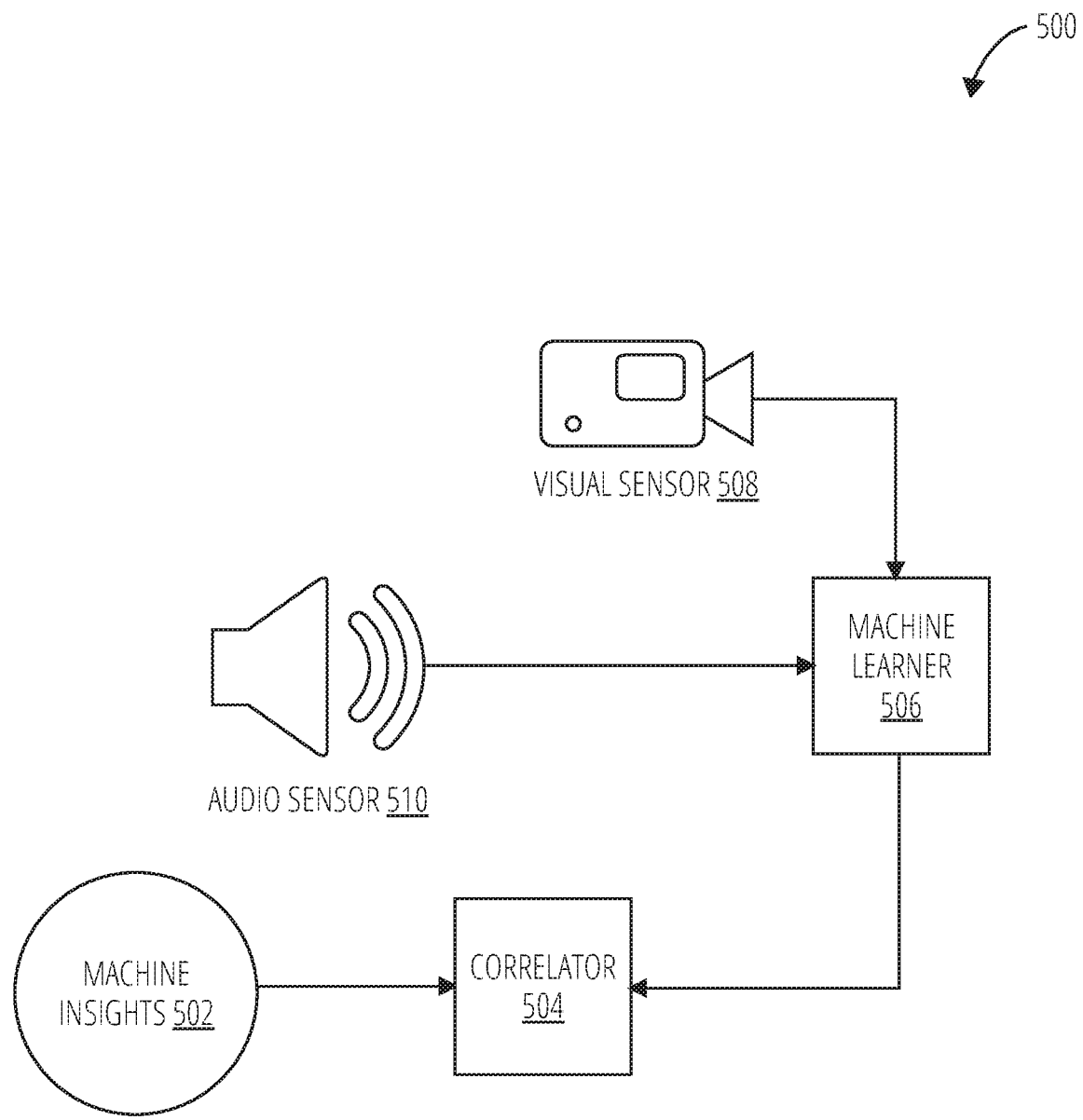
FIG. 5 illustrates an embodiment of a correlation system 500.

Referring to FIG. 5, the correlation system 500 comprises machine insights 502, a correlator 504, a machine learner 506, a visual sensor 508, and an audio sensor 510.

The machine insights 502 are produced due to the operation of systems such as the system for device behavior modeling based on empirical data 200 and are sent to the correlator 504. The correlator 504 receives the machine insights 502 and the output of the machine learner 506. The correlator 504 then produces a correlation between the machine insights 502 (produced by a large number of inputs) and the output of the machine learner 506 (produced from the visual sensor 508 and the audio sensor 510). The machine learner 506 receives sensor input data from the visual sensor 508 and the audio sensor 510 and generates an output utilizing the current state of the machine learner 506. The output is sent to the correlator 504. The visual sensor 508 converts electromagnetic (EM) radiation into sensor data signals, which are sent to the machine learner 506. The visual sensor 508 may be set to convert a portion of the EM spectrum (e.g., visible light, infrared, ultraviolet, or combination thereof). The audio sensor 510 receives sound waves (here, including infrasound and ultrasound waves) and converts them into sensor data signals, which are sent to the machine learner 506.

Figure 7:
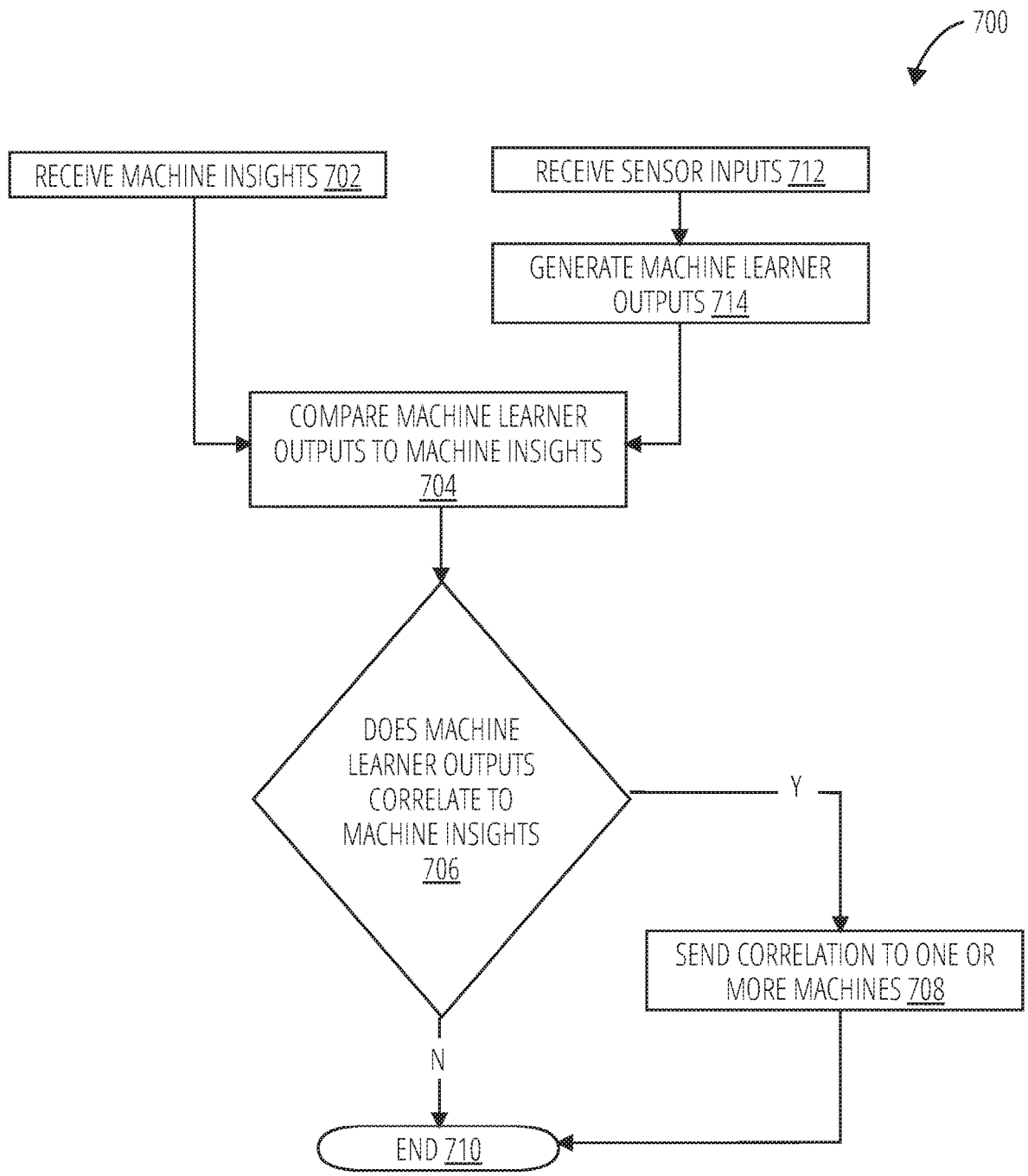
FIG. 7 illustrates an embodiment of a correlation method 700.

The correlation system 500 may be operated in accordance with FIG. 7.

Referring to FIG. 6, the machine training method 600 may receive input data (block 602). The input data is sent to a classifier and a machine learner (block 604). The input data received may be partitioned into sets of input data prior to being sent to the classifier and the machine learner. Outputs of the machine learner are generated (block 606). The outputs are then sent to a training module (block 608).

A classification scheme is selected (block 610). The classification scheme is utilized to transform the input data into transformation data (block 612). The transformation data is then sent to the training module (block 614).

The transformation data is compared to the outputs (block 616). The machine training method 600 determines whether to compare the outputs against another classification scheme (decision block 618). If so, steps block 610-block 616 are performed with the other classification scheme.

If another classification scheme is not to be compared, the machine training method 600 determines if the set of outputs compared to the set of transformed data is less than a threshold value (decision block 620). If not, the machine learner is updated (block 622). Then steps block 604—decision block 620 are re-performed. If the outputs are within a threshold value of the set of transformed data, the machine training method 600 ends (done block 624).

Referring to FIG. 7, the correlation method 700 receives machine insights (block 702). Sensor inputs are received (block 704). Sensor inputs may include visual data signals, audio data signals, etc. Machine learner outputs are generated from the sensor inputs (block 706). The machine learner outputs are compared to the machine insights (block 708). The correlation method 700 determines if the machine learner outputs correlate to the machine insights (decision block 710). If so, the correlation is sent to one or more machines (block 712). If not, the correlation method 700 ends (done block 714).

Figure 8:
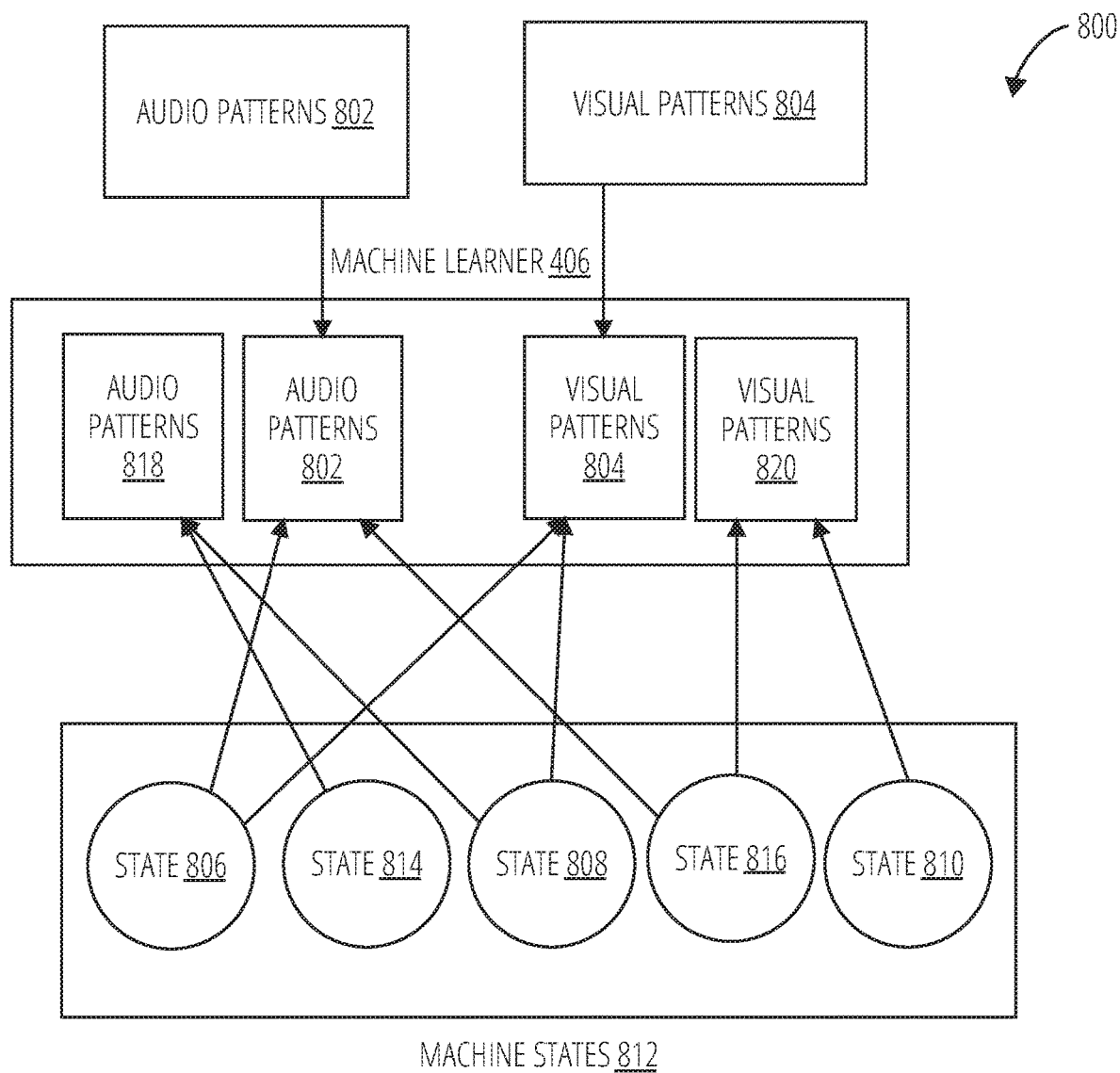
FIG. 8 illustrates an embodiment of a trained machine learner system 800.

Referring to FIG. 8, the trained machine learner system 800 comprises a machine learner 406, an audio patterns 802, visual patterns 804, a state 806, a state 808, a state 810, a machine states 812, a state 814, a state 816, an audio patterns 818, and visual patterns 820.

The machine learner 406 stores patterns including the audio patterns 802, the visual patterns 804, the audio patterns 818, and the visual patterns 820. The machine learner 406 correlates the pattern with various machine states 812. The machine states 812 includes the state 806, the state 808, the state 810, the state 814, and the state 816. As depicted, the state 806 is correlated with the audio patterns 802 and the visual patterns 804. The state 814 is correlated with the audio patterns 818. The state 808 is correlated with the visual patterns 804 and the audio patterns 818. The state 816 is correlated with the audio patterns 802 and the visual patterns 820. The state 810 is correlated with the visual patterns 820. During operation, the machine learner 406 may receive sensor input signals from audio and visual sensors, such as the audio patterns 802 and the visual patterns 804. The machine learner 406 determines that the current machine state is the state 806 based on the received sensor signals. The machine learner 406 may utilize backward chaining to determine that the current machine state is the state 806.

Figure 9:
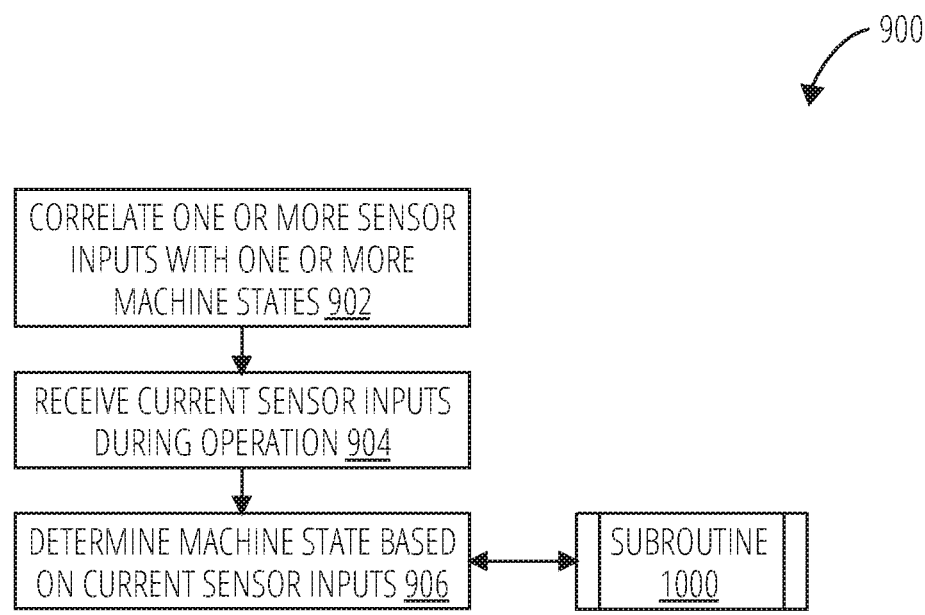
FIG. 9 illustrates an embodiment of a machine state prediction method 900.

The trained machine learner system 800 may be operated in accordance with FIG. 9.

Referring to FIG. 9, the machine state prediction method 900 correlates one or more sensor inputs with one or more machine states (block 902). Current sensor inputs are received during operation (block 904). A current machine state is determined from the one or more machine states based on the current sensor inputs (block 906). The subroutine block 1000 may be utilized to determine the current machine state.

Figure 10:
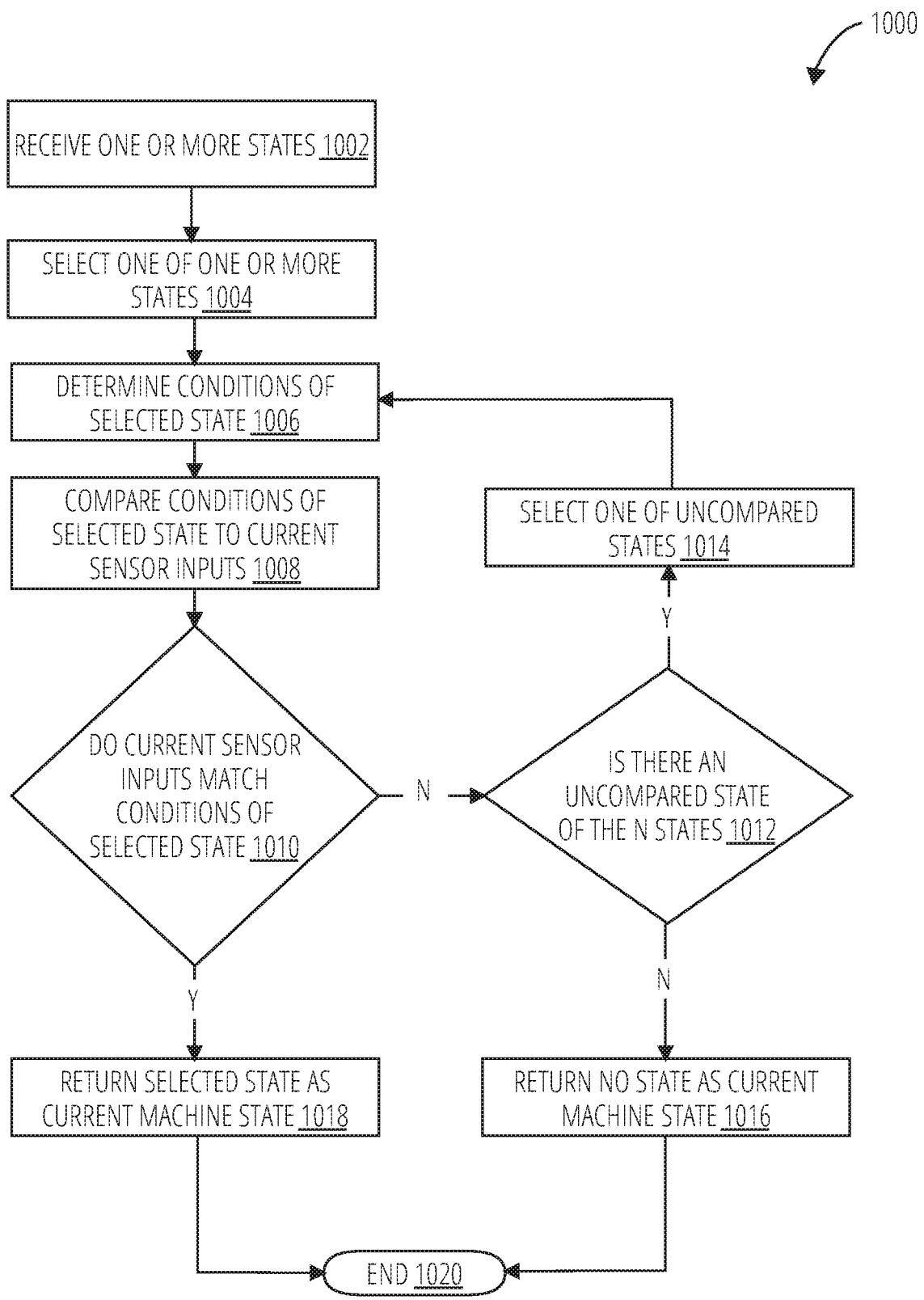
FIG. 10 illustrates an embodiment of a subroutine block 1000.

Referring to FIG. 10, the subroutine block 1000 receives one or more states (block 1002). One of the one or more states is selected (block 1004). The conditions of the selected state are determined (block 1006). The conditions of the selected state are compared to the current sensor inputs (block 1008). The subroutine block 1000 determines if the current sensor inputs match the selected state (decision block 1010). If not, the subroutine block 1000 determines if there is an uncompared state of the one or more states (decision block 1012). If so, one of the uncompared states is selected as the selected state (block 1014). If not, no state is returned as the current machine state (block 1016).

If the current sensor matches the conditions of the selected state, the selected state is returned as the current machine state (block 1018). Once either a selected state or no state is returned, the subroutine block 1000 ends (done block 1020).

Various selection techniques may be utilized to determine the first selected state of the one or more states as well as subsequent selected states. The subroutine block 1000 may also alter the machine state of one or more machines, such as a neural net training system, in response to determining that no state is the current machine state.

Figure 11:
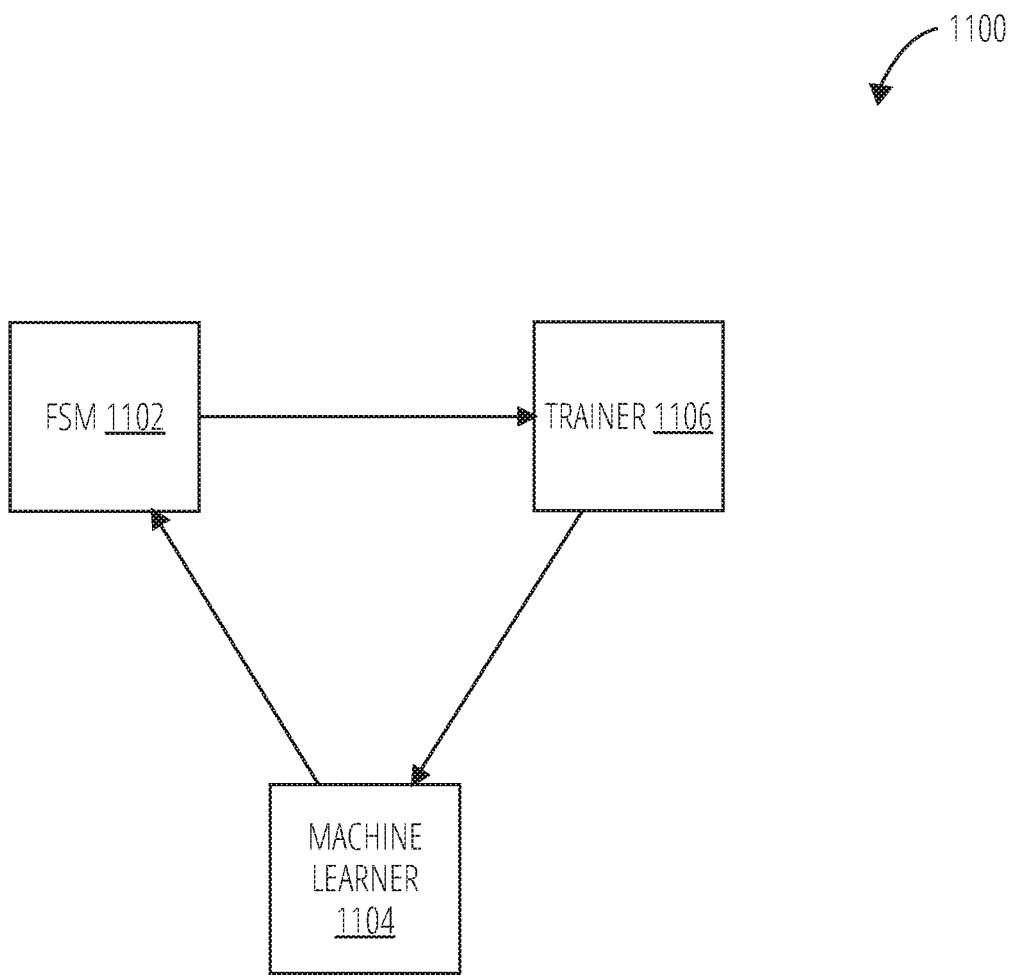
FIG. 11 illustrates an embodiment of a system 1100.

Referring to FIG. 11, the system 1100 comprises a finite state machine 1102, a machine learner 1104, and a trainer 1106.

The finite state machine 1102 may describe a model of machine states and their transitions therebetween. The machine states are sent to the trainer 1106, which utilizes the model and input data to train the machine learner 1104. The machine learner 1104 then uses current input signals to determine the current machine state of the finite state machine 1102.

Figure 12:
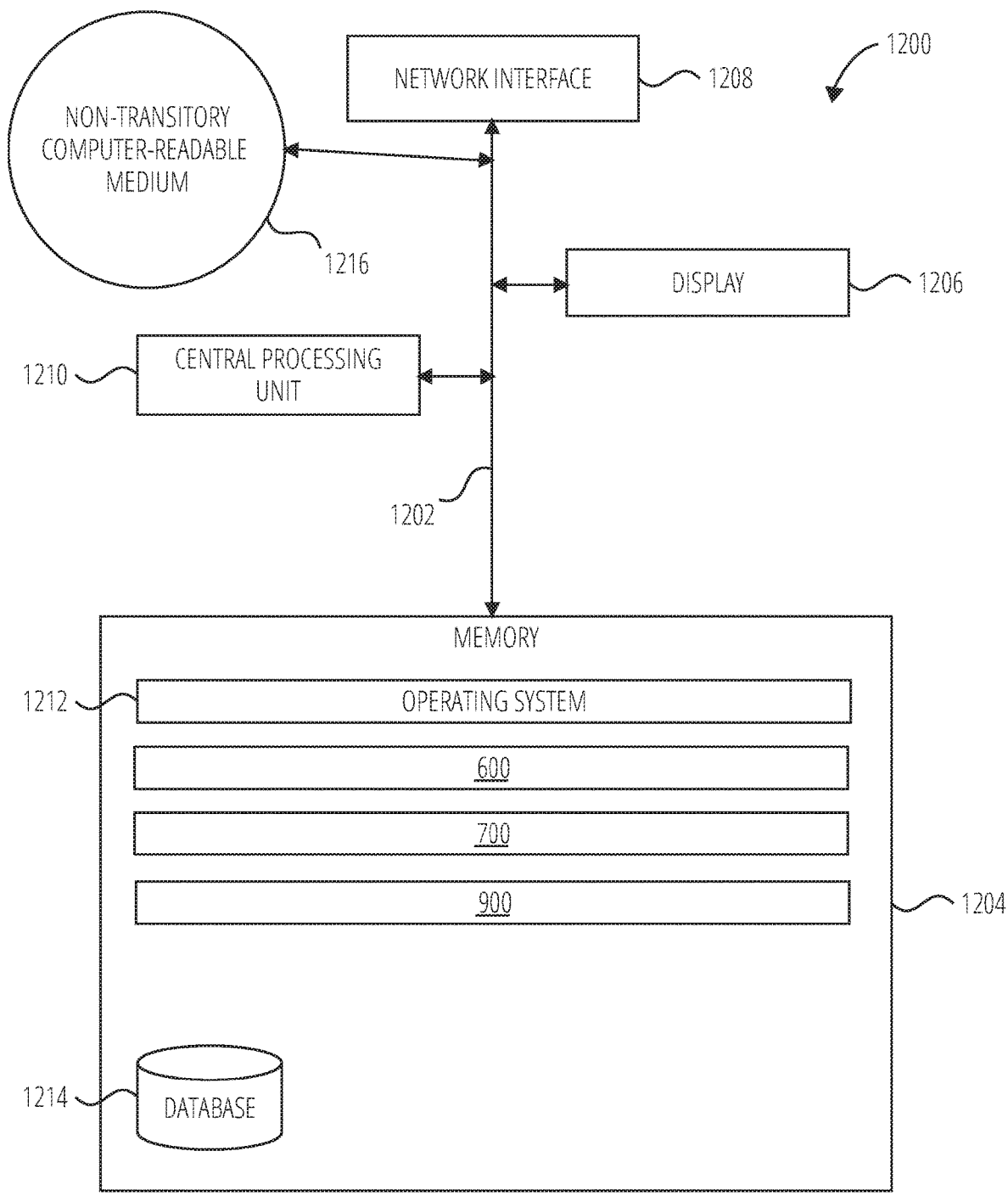
FIG. 12 illustrates a system 1200 in accordance with one embodiment.

FIG. 12 illustrates several components of an exemplary system 1200 in accordance with one embodiment. In various embodiments, system 1200 may include a desktop PC, server, workstation, mobile phone, laptop, tablet, set-top box, appliance, or other computing device or apparatus that is capable of performing operations such as those described herein. In some embodiments, system 1200 may include many more components than those shown in FIG. 12. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1200 may comprise one or more physical and/or logical devices that collectively provide the functionalities described herein. In some embodiments, system 1200 may comprise one or more replicated and/or distributed physical or logical devices.

In some embodiments, system 1200 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1200 includes a bus 1202 interconnecting several components including a network interface 1208, a display 1206, a central processing unit 1210, and a memory 1204.

Memory 1204 generally comprises a random access memory ("RAM") and permanent non-transitory mass storage device, such as a hard disk drive or solid-state drive. Memory 1204 stores an operating system 1212.

These and other software components may be loaded into memory 1204 of system 1200 using a drive mechanism (not shown) associated with a non-transitory computer-readable medium 1216, such as a DVD/CD-ROM drive, memory card, network download, or the like.

Memory 1204 also includes database 1214. In some embodiments, system 1200 may communicate with database 1214 via network interface 1208, a storage area network ("SAN"), a high-speed serial bus, and/or via the other suitable communication technology.

In some embodiments, database 1214 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

"Circuitry" herein refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Classifier" herein refers to logic implement classification of data, i.e. to map input data into categories. This may be accomplished, for example through the application of mathematical functions to find relationships shared by category members.

"Firmware" herein refers to software logic embodied as processor-executable instructions stored in read-only memories or media.

"Hardware" herein refers to logic embodied as analog or digital circuitry.

"Logic" herein refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Machine insights" herein refers to the product of analysis and predictions of machine behavior generated from machine modeling. For example, manual and automatic classification of states, providing information about the probability of any given set of variables changing, or the relationships between those variables changing. This may also be relationships based on discovered states and state transitions. For example, machine insights may embody information on the reliability and failure analysis of machines. It may also be embodied as a graph, wherein tracing paths between nodes may show the probabilities of certain states occurring and also thereby show paths to transitioning current states back to previous states. Path-tracing may incorporate clustering, and the use of time as a component when tracing transitions between nodes, highly probably but very slow transitions may be discovered along with fairly improbably, but very fast transitions. The system may find the shortest, and thus most probable path between nodes may then be found, in one embodiment, Dijkstra's algorithm may be used. Changes in the variables used for clustering may be correlated along the probabilistic pathways, which may uncover information previously too obfuscated to be revealed. Further, provided that definitions of nodes and edges in a machine follow Markovian constraints, a Markov model or chain may be built, which would allow efficient computation of mean time to failure and transient instantaneous failure rate.

"Machine learner" herein refers to logic to implement machine learning algorithms to detect patterns and relationships in data. A variety of known algorithms to train the machine learner, for example: Levenberg-Marquardt, Quasi-Newton, Resilient Back propagation, Scaled Conjugate Gradient, Conjugate Gradient with Powell/Beale Restarts, Fletcher-Powell Conjugate Gradient, Polak-Ribiére Conjugate, GradientOS, Strainoss, One Step Secant, Back-propagation, and Variable Learning Rate Back propagation.

"Machine learner prediction" herein refers to predictions and estimations generated by a machine learner. For example, this may be the machine learner predicting data's membership in a particular class or may be the prediction or estimation of a given value or outcome.

"Programmable device" herein refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Selector" herein refers to logic implemented to select at least one item from a plurality of items, for example, a multiplexer, or switch.

"Software" herein refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be affected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be affected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

What is claimed is:

1. A method comprising:
receiving sensor input data from a plurality of sensors and machine insights, the machine insights comprising one or more states, with a trainer, the trainer generating a selection signal;
operating a selector with the selection signal to select a classification scheme, the classification scheme specifying a classifier;
transforming the machine insights and the sensor input data into training data utilizing the classifier;
transforming the sensor input data into a class prediction with the classifier;
applying the machine insights and the sensor input data to a machine learner to generate a machine learner prediction; and
comparing the class prediction and the machine learner prediction with a tester and altering a machine state of one or more machines if the difference between the class prediction and the machine learner prediction is less than a threshold value and updating the machine learner if the difference between the class prediction and the machine learner prediction is not less than the threshold value.

2. The method of claim 1, wherein the one or more machines is the trainer.

3. The method of claim 2, wherein the trainer's altered machine state prompts the generation of an update selection signal to operate the selector to select a different classification scheme.

4. The method of claim 2, wherein the trainer's altered machine state prompts the generation of an update signal to update the machine learner.

5. The method of claim 1, wherein the machine learner further comprises a neural network.

6. The method of claim 1, wherein the one or more machines is a message transmitter, the message transmitter sending a message comprising one of the one or more states as a current state.

7. The method of claim 1, wherein the trainer transmits a correlation to the one or more machines if the trainer determines that the machine learner outputs correlate to the machine insights.

8. The method of claim 1, wherein:
the trainer selects one of the one or more states;
determines conditions of the one or more states;
compares the conditions to the sensor input data; and
alters the machine state of the one or more machines in response to comparing the conditions to the sensor input data.

9. The method of claim 1, wherein the sensor input data further comprises at least one of data signals, audio data signals, vibration data signals, and electromagnetic data signals and combinations thereof.

10. A computing apparatus, the computing apparatus comprising:
a processor; and
a memory storing instructions that, when executed by the processor, configure the apparatus to:
receive sensor input data from a plurality of sensors and machine insights, the machine insights comprising one or more states, with a trainer, the trainer generating a selection signal;
operate a selector with the selection signal to select a classification scheme, the classification scheme specifying a classifier;
transform the machine insights and the sensor input data into training data utilizing the classifier;
transform the sensor input data into a class prediction with the classifier;
apply the machine insights and the sensor input data to a machine learner to generate a machine learner prediction; and
compare the class prediction and the machine learner prediction with a tester and altering a machine state of one or more machines if the difference between the class prediction and the machine learner prediction is less than a threshold value and updating the machine learner if the difference between the class prediction and the machine learner prediction is not less than the threshold value.

11. The computing apparatus of claim 10, wherein the one or more machines is the trainer.

12. The computing apparatus of claim 11, wherein the trainer's altered machine state prompts the generation of an update selection signal to operate the selector to select a different classification scheme.

13. The computing apparatus of claim 11, wherein the trainer's altered machine state prompts the generation of an update signal to update the machine learner.

14. The computing apparatus of claim 10, wherein the machine learner further comprises a neural network.

15. The computing apparatus of claim 10, wherein the one or more machines is a message transmitter, the message transmitter sending a message comprising one of the one or more states as a current state.

16. The computing apparatus of claim 10, wherein the trainer transmits a correlation to the one or more machines if the trainer determines that the machine learner outputs correlate to the machine insights.

17. The computing apparatus of claim 10, wherein the trainer:
selects one of the one or more states;
determines conditions of the one or more states;
compares the conditions to the sensor input data; and
alters the machine state of the one or more machines in response to comparing the conditions to the sensor input data.

18. The computing apparatus of claim 10, wherein the sensor input data further comprises at least one of data signals, audio data signals, vibration data signals, and electromagnetic data signals and combinations thereof.

* * * * *